No. 884,199. PATENTED APR. 7, 1908.
J. W. NORTH.
NUT LOCK.
APPLICATION FILED DEC. 5, 1907.

Witnesses
Inventor
James W. North.
By H. C. Evert
Attorneys

UNITED STATES PATENT OFFICE.

JAMES W. NORTH, OF ALLEGHENY, PENNSYLVANIA.

NUT-LOCK.

No. 884,199.  Specification of Letters Patent.  Patented April 7, 1908.

Application filed December 5, 1907. Serial No. 405,174.

*To all whom it may concern:*

Be it known that I, JAMES W. NORTH, a citizen of the United States of America, residing at Allegheny, in the county of Allegheny and State of Pennsylvania, have invented certain new and useful Improvements in Nut-Locks, of which the following is a specification, reference being had therein to the accompanying drawing.

This invention relates to nut locks, and its object is to provide a very simple and inexpensive device for preventing a nut from turning upon a bolt after the nut has been secured in place.

The invention avoids the employment of springs, locking pawls or dogs or like supplemental devices which are easily disarranged; and it also provides a locking device which is applicable to any ordinary bolt and nut.

The invention comprises a wire formed for a portion of its length with teeth, and adapted to be looped around a bolt adjacent to the securing nut, one end of the wire reëngaging the bolt.

The construction of the improvement will be fully described hereinafter in connection with the accompanying drawing which forms a part of this specification, and the novel features will be set forth in the appended claims.

Figure 1:
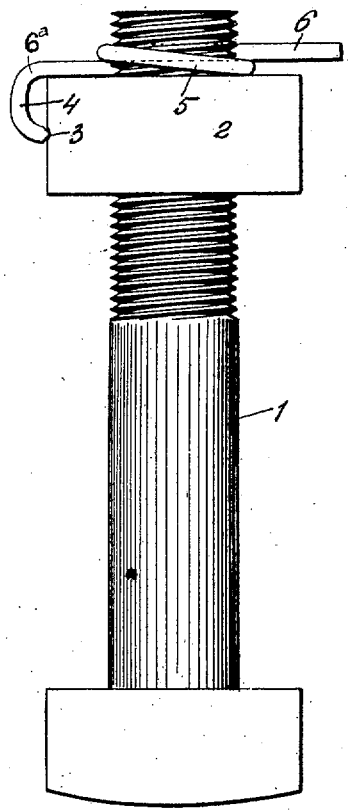
Figure 2:
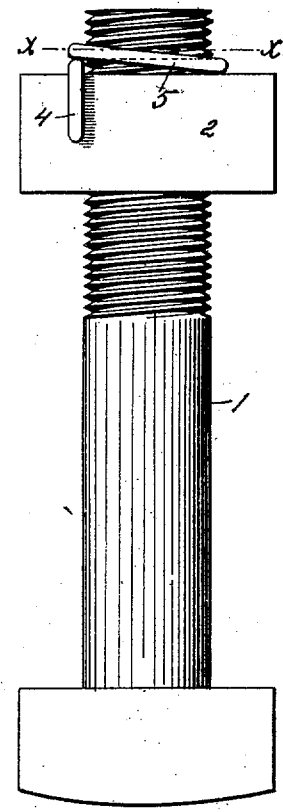
Figure 3:
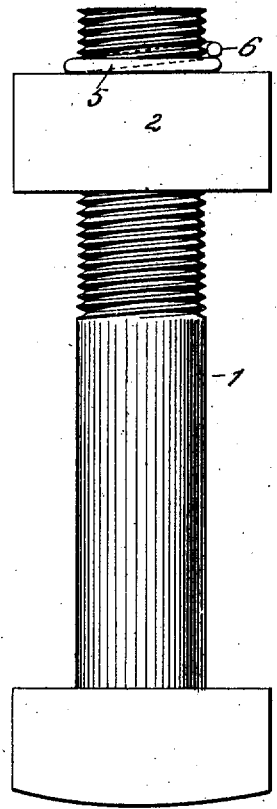
Figure 4:
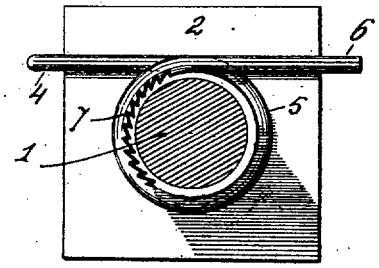
Figure 5:
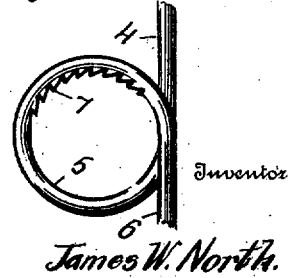

In the drawing:—Figure 1 is a side elevation of a bolt and nut with my improved locking devices applied thereto, Fig. 2 is a plan view of the same, Fig. 3 is a reverse or bottom plan of the bolt, nut, and nut lock, Fig. 4 is a transverse section of the bolt, and Fig. 5 is an elevation of the locking wire detached from the bolt and nut.

The reference numeral 1 designates a bolt, and 2 a nut thereon, the latter being formed on one side with a recess 3.

A nut lock constructed in accordance with my invention is formed from a single piece of wire which is shaped to provide a coil or loop 5 adapted to receive the threaded end of the bolt 1, and lie against the outer face of the nut as clearly seen in Figs. 1 2 and 3. The forming of the coil or loop 5 causes the ends of the piece of wire to project in opposite directions and provides arms 6, 6ª, respectively, the arm 6ª lying in engagement with the face of the nut 2 when the lock is in position, and being somewhat longer than the arm 6 so that the outer portion 4 thereof may be bent over the side of the nut 2, and this bent portion 4 is so curved that the extreme end thereof may be projected in towards the nut and engaged in the recess 3 provided in one of the side walls of said nut. The arm 6 of the lock is free from engagement with the face of the nut as clearly seen by reference to Figs. 1 and 3, owing to the fact that the point where the coil or loop is completed one portion of the wire must lie upon the other portion thereof. This arm 6 is of a length however, to project beyond the face of the nut opposite to that face engaged by the curved portion 4 of the arm 6ª, and after the lock has been placed on the bolt, the forcing of the arm 6 towards the bolt causes the coil or loop to be tightened firmly against the latter.

A portion of the inner surface of the loop 5 is formed with teeth 7, which as shown in the drawing extend across the contiguous threads of the bolt and engage the same. Any tendency of the nut to loosen upon the bolt causes the teeth 7 of the locking wire to closely grip the threads of the bolt and prevent the bolt from turning.

It is obvious that the improvement requires no special construction of nut or bolt, no modification in the form of either being necessary except the formation of the recess or indentation 3 in the bolt to receive the hooked end of the locking wire.

The locking wire, which is preferably made of tempered steel, may be manufactured at small expense, and quickly applied to a bolt and nut by the employment of the simple bending tools.

Having fully described my invention what I claim as new and desire to secure by Letters Patent, is, The combination with a bolt, and a nut thereon, of a lock for the nut, formed from a single piece of wire bent intermediate its ends to form a loop or coil to encircle the bolt, the remaining portions of said wire extending in opposite directions from the loop and forming arms of unequal length, the longer of which has its free end bent over the nut to engage with a recess provided in the latter, said longer arm lying in engagement with the nut, and the shorter arm being free from engagement with the nut, the said loop being provided on a portion of its inner face with teeth to engage the threads of the bolt, as and for the purpose described.

In testimony whereof I affix my signature in the presence of two witnesses.

JAMES W. NORTH.

Witnesses:
 MAX H. SROLOVITZ,
 C. A. RENZIEHAUSEN.